United States Patent [19]
Glover et al.

[11] Patent Number: 5,933,659
[45] Date of Patent: Aug. 3, 1999

[54] CAMERA

[75] Inventors: Edward C. Glover; Martyn S. Glover, both of Harrow, United Kingdom

[73] Assignee: Eastman Kodak Company, Rochester, N.Y.

[21] Appl. No.: 08/961,437

[22] Filed: Oct. 30, 1997

[30] Foreign Application Priority Data

Nov. 13, 1996 [GB] United Kingdom ............... 96023566

[51] Int. Cl.$^6$ .................................................. G03B 17/24
[52] U.S. Cl. ............................................. 396/6; 396/348
[58] Field of Search ........................................ 396/6, 348

[56] References Cited

U.S. PATENT DOCUMENTS

| | | |
|---|---|---|
| 360,499 | 4/1887 | Whittell . |
| 1,291,452 | 1/1919 | Farmer . |
| 1,298,312 | 3/1919 | Earle . |
| 1,366,158 | 1/1921 | Brown . |
| 2,083,492 | 6/1937 | Cheshire . |
| 2,559,214 | 7/1951 | Fried . |
| 2,612,092 | 9/1952 | Heyer et al. . |
| 2,667,111 | 1/1954 | Fried . |
| 2,751,825 | 6/1956 | Fried . |
| 2,789,490 | 4/1957 | Kaufman . |
| 3,412,662 | 11/1968 | Balalis . |
| 3,640,724 | 2/1972 | Erlichman . |
| 3,877,047 | 4/1975 | Douglas . |
| 4,072,970 | 2/1978 | Winkler . |
| 4,226,517 | 10/1980 | Skarman . |
| 4,245,035 | 1/1981 | Poshkus . |
| 4,329,037 | 5/1982 | Caviness . |
| 4,518,235 | 5/1985 | Reed et al. . |
| 4,547,053 | 10/1985 | Tobler . |
| 4,660,951 | 4/1987 | Reed et al. . |
| 4,723,140 | 2/1988 | Whiteside et al. . |
| 4,846,553 | 7/1989 | Rice . |
| 5,043,751 | 8/1991 | Rice . |

FOREIGN PATENT DOCUMENTS

| | | |
|---|---|---|
| 623166 | 6/1927 | France . |
| 196626 | 9/1906 | Germany . |
| 2342576 | 3/1975 | Germany . |
| 2728788 | 1/1979 | Germany . |
| 3328648 | 4/1984 | Germany . |
| 6-138533 | 5/1994 | Japan . |
| 6-138584 | 5/1994 | Japan . |
| 8654 | of 1886 | United Kingdom . |

*Primary Examiner*—David M. Gray
*Attorney, Agent, or Firm*—Robert Luke Walker

[57] ABSTRACT

A collapsible camera comprising a body defined by a first panel, a second panel and rigid support means. The first and second panels are substantially planar and parallel when the camera body is in its collapsed condition and bowed away from each other when the camera body is erected. When the camera body is erected, the rigid support means act between the first and second panels to define and retain the spacing between the panels during normal usage of the camera. By including rigid support means, reliable focussing of an image on a film in the camera can be achieved.

22 Claims, 2 Drawing Sheets

CAMERA

FIELD OF THE INVENTION

This invention relates to cameras, and in particular to compact collapsible cameras which may or may not be disposable.

BACKGROUND OF THE INVENTION

Large collapsible cameras have been well known for many years. Such cameras have, in the main, included complicated mechanisms for collapsing the bellows between the camera lens and the image receiving plane of the camera. As a result, such cameras have tended to be relatively expensive and have, therefore, been designed to be reusable.

During the last few years, pocket or compact cameras have become popular and, more recently, even smaller disposable cameras have become known. Such disposable cameras are designed to be returned to a processor after the film within the camera has been exposed to have the film developed. The camera body may then be recycled by a manufacturer, rather than an end user. Disposable cameras of this type have tended to be smaller than the pocket or compact cameras.

Although the known disposable cameras are small, there is still a demand for even smaller cameras. Indeed, there is a demand for a camera which can be fitted into a wallet, for example. To enable such a camera to be produced, it is considered necessary to limit the number of photographs which can be taken by the camera, possibly to one; and that it will be necessary for the camera to be collapsible, since the normal distance required between a camera aperture/lens and the camera image receiving plane is too long to fit into a wallet. A paper proposal for such a credit-card-size camera for single-shot emergency use is described in U.S. Pat. No. 5,043,751.

As far as the present applicant is aware, a commercial camera based on the disclosure of U.S. Pat. No. 5,043,751 was never made. Furthermore, having manufactured a camera according to U.S. Pat. No. 5,043,751, the present applicant has found that the bracing of the camera is completely inadequate to enable a satisfactory photograph to be taken. This is because the proposed camera body is manufactured from sheets of paper and, as a result, does not have sufficient rigidity to hold its shape during activation of the shutter mechanism. Further, the score lines, which enable the body of the camera to be formed, can readily give way such that the focal length of the camera changes.

SUMMARY OF THE INVENTION

With the foregoing in mind, the present applicant has developed an improved collapsible camera which is actually usable in practice to take photographs of acceptable quality.

According to the present invention, there is provided a collapsible camera comprising a body defined by a first panel, a second panel and rigid support means, the first and second panels being substantially planar and parallel when the camera body is in its collapsed condition and bowed away from each other when the camera body is erected, wherein, when the camera body is erected, the rigid support means act between the first and second panels to define and retain the spacing between the panels during normal usage of the camera.

By including rigid support means, rather than the hinged, and hence flexible, surfaces disclosed in the prior art, a practical solution to the demand highlighted above has been provided. Further, this solution was in no way obvious prior to the making of this invention, because the idea of including rigid support means was completely contrary to the accepted approach regarding how best to reduce the size of the camera.

Preferably the rigid support means act substantially perpendicularly to and between the first and second panels.

Preferably the first panel defines an aperture for the camera and the rigid support means act between the panels on opposite sides of the aperture. Such an arrangement helps to produce an even more rigid structure, thereby resulting in a reliable and accurate focal length of the camera being produced.

In one embodiment, the rigid support means comprise support beams, each of which is hingedly connected to only one of the first and second panels. In a preferred embodiment, two support beams are included, both of which are connected to the same panel.

Preferably, each support beam includes at least one projection which engages a keeper in the other of the first and second panels when the camera body is erected. This arrangement is simple to manufacture, easy to use and allows a user to see that the support means are correctly assembled. In alternative embodiments, however, the support beams could be held in position by means of recesses, grooves, detents or clips, for example.

In one embodiment of the present invention, the rigid support means may comprise support members formed by cutting windows in the panels. If the support members are formed in this way, each support member is preferably integral with a panel and is accommodated within the plane of the panel when the camera is collapsed. A very neat and compact collapsed camera can thereby be provided.

In another arrangement, the rigid support means may be connected to both of the first and second panels and include a hinge midway between the first and second panels which, when the camera is erected, locks over-center such that the spacing between the first and second panels cannot be reduced. With this in mind, as will be appreciated, due to the bowing of the first and second panels, the panels continuously apply a compressive force on the rigid support means such that the hinge is continuously biased towards its locking position. It is only when the first and second panels are forced to bow further that the hinge can be released to allow the camera body to be collapsed. Thus, during normal usage, the camera body will remain correctly erected.

Preferably the first panel supports a lens, the second panel supports a film and a black-out bellows acts between the first and second panels. Alternatively, the film could be replaced by an electronic capture device. Such devices are becoming more common, and there is no reason why a collapsible camera according to the present invention could not be used with such a device.

Although it is envisaged that the first panel may carry a shutter which, when released, allows only one photograph to be taken, in theory the camera could be used to take two or more consecutive photographs.

To enable a camera according to the present invention to be as small as possible, film sufficient for only one photograph may be included in the body of the camera.

Preferably the first and second panels are connected by means of hinges. At least one of these hinges may be formed by a web between the two panels, which may be formed integrally from one piece of material. If this is the case, the first and second panels may be manufactured from plastics material, such as polyvinyl chloride. The panels may, however, be formed of any other appropriate resilient material, such as spring steel for example, as necessary.

The rigid support means may act as a lens cover for the camera when the camera body is collapsed. This can be achieved by having the rigid support means hingedly mounted on the panel which carries the camera lens.

Although it is envisaged that a camera according to the present invention, in its collapsed state, will be less than 10 mm thick, in a preferred embodiment the thickness will be less than 6.5 mm. As a result, a camera according to the present invention can be readily stored in a wallet, for example.

BRIEF DESCRIPTION OF THE DRAWINGS

Specific embodiments of the present invention are now described, by way of example only, with reference to the accompanying drawings, in which.

DETAILED DESCRIPTION OF THE INVENTION

Figure 1:
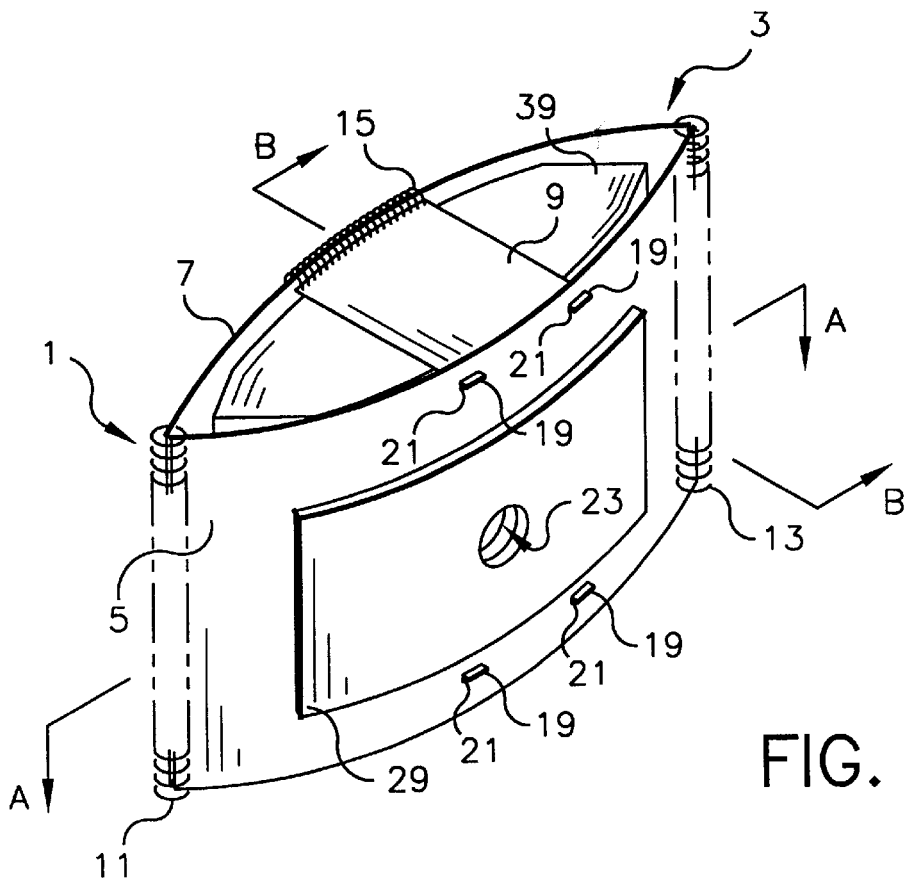
FIG. 1 is a schematic perspective view of a collapsible camera according to the present invention.

With reference to FIGS. 1–4 of the drawings, a collapsible camera 1 according to the present invention comprises a camera body 3 defined by a front panel 5, a rear panel 7 and two support members 9. The front and rear panels 5,7 are connected together by hinges 11,13, one or both of which may be formed integrally with the two panels 5,7. If the hinges 11,13 are formed integrally with the panels 5,7, the hinges may comprise simple webs between adjacent side edges of the panels 5,7.

Figure 3:
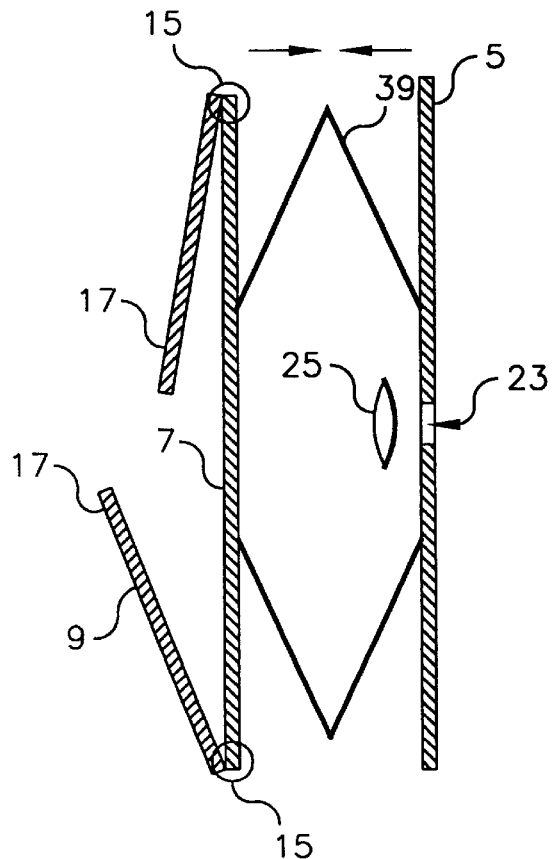
FIG. 3 is a schematic sectional side view along the line BB in FIG. 1, but wherein the camera is partly collapsed.

In the specific embodiment shown in FIGS. 1 and 3, the support members 9 are connected by hinges 15 to the top and bottom edges respectively of the rear panel 7. The free end 17 of each support member 9 carries a pair of projections 19 for engaging apertures 21 in the front panel 5. In another embodiment (not shown), the or each support member 9 may be hinged about an axis substantially perpendicular to the hinges 15, such that the or each support member 9 is positioned within the camera body 3, between the panels 5,7, when the body 3 is collapsed.

Figure 2:
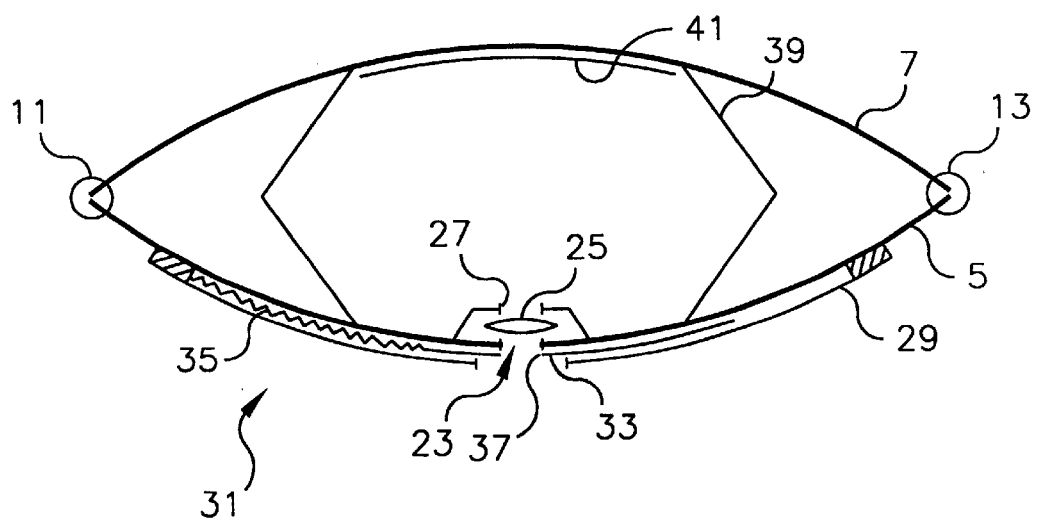
FIG. 2 is a schematic sectional plan view along the line AA shown in FIG. 1.
Figure 4:
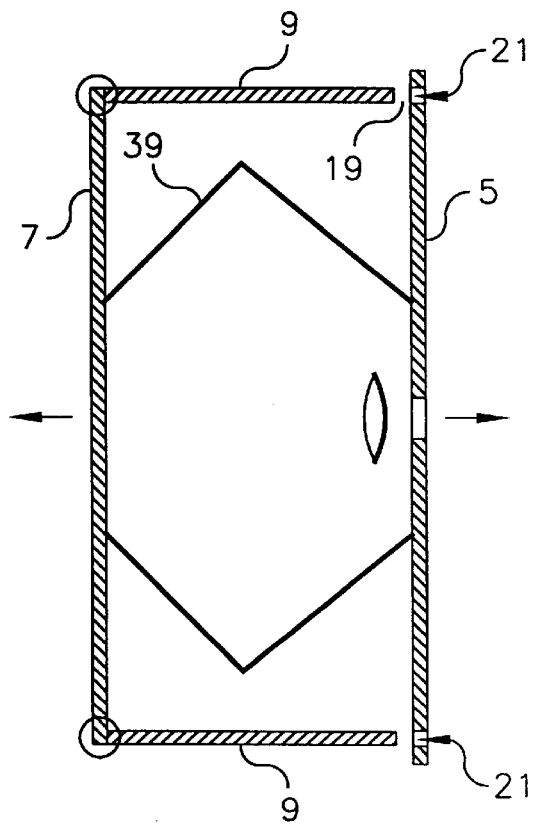
FIG. 4 is a similar view to that shown in FIG. 3, but wherein the camera body is almost erected.

As will be appreciated, when opposing forces are applied to the hinged edges 11,13 of the panels 5,7, the resilient nature of the panels 5,7 allows the panels to bow outwardly away from each other as shown in FIGS. 1 and 2 of the drawings. When the panels 5,7 have been forced to bow, the support members 9 can be swung about their hinges 15 such that the projections 19 align with the apertures 21 in the front panel 5 as shown in FIG. 4. The force being applied to the hinges 11,13 can then be released such that the projections 19 engage the apertures 21 to define the erected camera body 3. The actual distance between the front panel 5 and the rear panel 7 is dictated by the length of each support member 9 which, due to the rigidity of the support members 9, is accurately defined and retained during use of the camera.

As can be seen clearly in FIG. 2 of the drawings, the front panel 5 defines an opening 23 behind which a lens 25 and an iris 27 are carried by the front panel 5. Further, mounted on the front of the front panel is a casing 29 for a shutter mechanism 31. The shutter mechanism 31 comprises a shutter 33 attached to the casing 29 by means of a spring 35. The shutter 33 includes an aperture 37 which is drawn across the opening 23 when a photograph is being taken. Otherwise, the aperture 37 is hidden from the opening 23 such that light from outside the camera body 3 cannot enter the camera body 3 through the opening 23.

A collapsible bellows 39 acts between the front panel 5 and the rear panel 7 to prevent light reaching a film 41 within the bellows 39 carried by the rear panel 7.

As will be appreciated, it is essential that the distance from the lens 25 to the plane of the film 41 is accurately defined to enable a sharp, in focus, image to be captured by the photographic film 41. As mentioned above, this distance is defined by the support members 9 which, due to their rigidity, do indeed produce an accurate result. This is a significant improvement over the prior art discussed above, wherein the distance between the lens and the photographic film may vary due to the resiliency of the non-rigid support members disclosed in the prior art.

To enable the camera body 3 to be collapsed after use, it is simply necessary to apply pressure to the hinges 11,13 of the body 3 such that the front and rear panels 5,7 bow further and the projections 19 of the support members 9 disengage from the apertures 21 in the front panel 5. The support members 9 can then be moved back to their stored positions, as shown in FIG. 3, and the bowing of the front and rear panels 5,7 can be reduced until the panels 5,7 lie adjacent and substantially parallel to each other. The complete thickness of the camera 1, in this closed or collapsed state, is less than 10 mm, and preferably less than about 6.5 mm.

Although not shown in the drawings, one or both of the support members 9 could be hingedly connected to the front panel 5 rather than to the rear panel 7. During use, the support members 9 would then engage the rear panel 7 to support the camera body 3 in its erected state. Further, when the camera body 3 is collapsed, the or each support member 9 may overlap the camera lens 25 to act as a lens cover to protect the lens during non-use.

Figure 5:
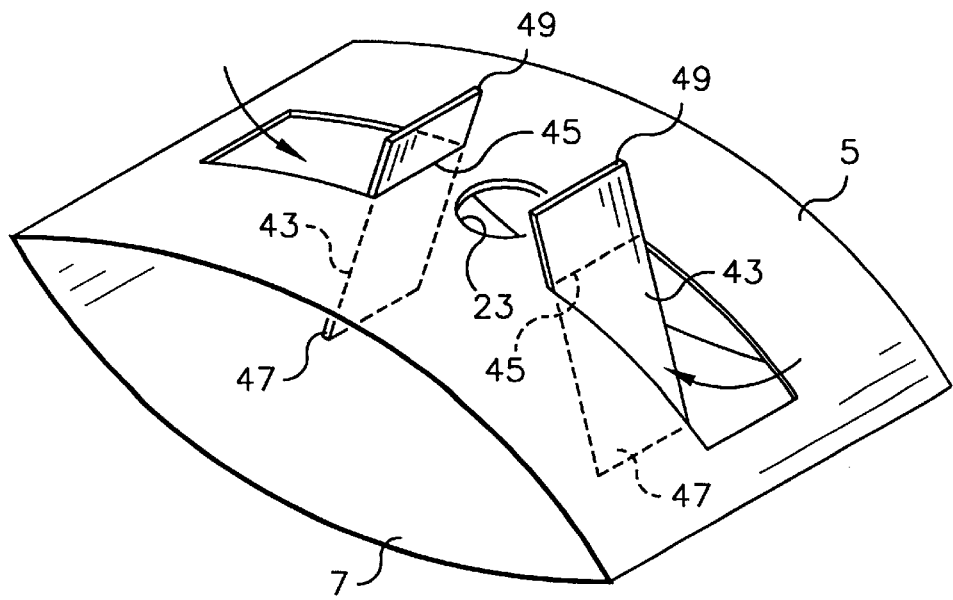
FIG. 5 is a schematic perspective view of a body of a second embodiment of collapsible camera according to the present invention.

Turning now to FIG. 5 of the drawings, a second embodiment of collapsible camera case 3 is shown. In this embodiment, the front and rear panels 5,7 are once again hinged together and can be bowed outwards away from each other as in the first embodiment. However, instead of including the support members 9 of the first embodiment, bracing members 43 formed integrally with the front panel 5 are included. As can be seen in FIG. 5, the bracing members 43 are formed by cutting three sides of a rectangle from the front panel 5 such that the fourth side of the rectangle can act as hinge 45 about which the bracing member 43 can swing. Thus, when the front and rear panels 5,7 have been bowed outwardly, the bracing members 43 can be swung inwardly until the free ends 47 of the bracing members 43 engage the rear panel 7 at the desired positions, possibly defined by means of projections 19 and apertures 21 as in the first embodiment. Alternatively, the free ends 47 could engage in grooves, clips or any other suitable formation (not shown).

As a result of the bracing members 43 being cut from the front panel 5, when the camera body 3 is collapsed the bracing members 43 can lie within the plane of the front panel 5, thereby reducing further the thickness of the collapsed camera body 3.

As shown in FIG. 5, extensions 49 may be added to the bracing members 43. These extensions 49 are arranged to overlap the lens (not shown) of the camera 1 when the camera body 3 is collapsed, thereby protecting the lens during non-use of the camera 1. Conversely, when the camera body 3 is erected, the extensions 49 do not hinder the opening 23 formed in the front panel 5.

It will of course be understood that the present invention has been described above purely by way of example, and that modifications of detail can be made within the scope of the invention.

What is claimed is:

1. A collapsible camera comprising a body defined by a first panel, a second panel, and rigid support means, the first and second panels being substantially planar and parallel when the camera body is in a collapsed condition and bowed away from each other when the camera body is erected, the rigid support means comprising support beam, each of which is hingedly connected to only one of the first and second panels, wherein, when the camera body is erected, the support beams act between the first and second panels to define and retain the spacing between the panels during normal usage of the camera.

2. A camera as claimed in claim 1, wherein the support beams act substantially perpendicularly to and between the first and second panels.

3. A camera as claimed in claim 1, wherein the first panel defines an aperture for the camera and the support beams act between the panels on opposite sides of the aperture.

4. A camera as claimed in claim 1, wherein two support beams are included, both of which are connected to the same panel.

5. A camera as claimed in claim 1, wherein each support beam includes at least one projection which engages a keeper in the other of the first and second panels when the camera body is erected.

6. A camera as claimed in claim 1, wherein the first panel supports a lens, the second panel supports a film and a black-out bellows acts between the first and second panels.

7. A camera as claimed in claim 1, wherein the first panel carries a shutter which, when released, allows one photograph to be taken.

8. A camera as claimed in claim 1, wherein the first and second panels are connected by means of hinges.

9. A camera as claimed in claim 1, wherein the first and second panels are formed integrally from one piece of material.

10. A camera as claimed in claim 1, wherein the first and second panels are manufactured from plastics material.

11. A camera as claimed in claim 10, wherein the plastics material is polyvinyl chloride.

12. A camera as claimed in claim 1, wherein the collapsed camera is less than 10 mm thick.

13. A camera as claimed in claim 1, wherein the collapsed camera is less than 6.5 mm thick.

14. A collapsible camera comprising a body defined by a first panel, a second panel, and rigid support means, the first and second panels being substantially planar and parallel when the camera body is in a collapsed condition and bowed away from each other when the camera is erected, the rigid support means comprising bracing members formed by cutting windows in the panels, wherein, when the camera body is erected, the bracing members act between the first and second panels to define and retain the spacing between the panels during normal usage of the camera.

15. A camera as claimed in claim 14, wherein each bracing member is integral with a panel and is accommodated within the plane of the panel when the camera body is collapsed.

16. A camera as claimed in claim 14, wherein the first panel supports a lens, the second panel supports a film and a black-out bellows acts between the first and second panels.

17. A camera as claimed in claim 14, wherein the first and second panels are connected by means of hinges.

18. A camera as claimed in claim 14, wherein the first and second panels are formed integrally from one piece of material.

19. A camera as claimed in claim 14, wherein the first and second panels are manufactured from plastics material.

20. A camera as claimed in claim 19, wherein the plastics material is polyvinyl chloride.

21. A camera as claimed in claim 14, wherein the collapsed camera is less than 10 mm thick.

22. A camera as claimed in claim 14, wherein the collapsed camera is less than 6.5 mm thick.

* * * * *